Feb. 16, 1926.
R. WEHR
ROTARY VALVE
Filed Jan. 27, 1925
1,573,022
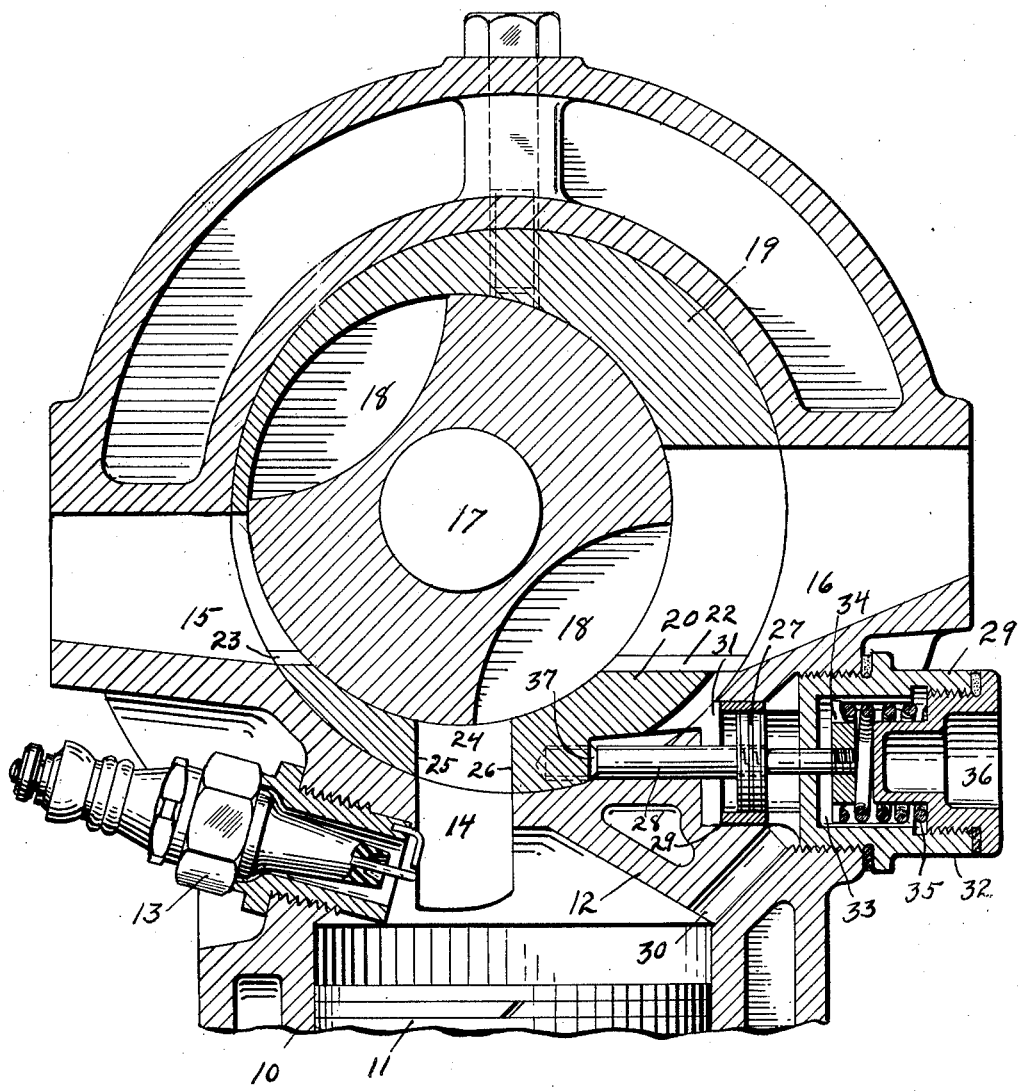
INVENTOR
Rudolph Wehr
BY
Denn Fairbanks Albrecht & Hirsch
ATTORNEYS Patented Feb. 16, 1926.

1,573,022

UNITED STATES PATENT OFFICE.

RUDOLPH WEHR, OF LOS ANGELES, CALIFORNIA.

ROTARY VALVE.

Application filed January 27, 1925. Serial No. 5,090.

*To all whom it may concern:*

Be it known that I, RUDOLPH WEHR, a citizen of the United States, and resident of Los Angeles, in the county of Los Angeles and State of California, have invented certain new and useful Improvements in Rotary Valves, of which the following is a specification.

This invention is an improvement in rotary valves, and has for its main object the provision of automatically acting means which will prevent leakage, particularly at the time when the pressure of the fluid controlled by the valve is the greatest.

Although my improved construction may be employed for controlling various fluids in various different types of apparatus or systems where one-way rotation of the valve is permissible, I have particularly in mind the use of the construction for controlling a port of an internal combustion engine where the pressure fluctuates rapidly, varying temperatures are present, and proper lubrication is difficult.

My invention is an improvement on the construction disclosed and broadly claimed in my prior Patent No. 1,347,978, issued June 27th, 1920. In the construction illustrated in said patent I employ a curved wedge shaped member movable circumferentially of a cylindrical valve and through a limited distance to vary the clearance between the valve and the stationary casing parts so that proper working fit may be maintained under varying conditions of operation.

The rotary valve shown in said patent is employed for controlling both the inlet and exhaust through the single port of an engine cylinder, and the wedge member is disposed on the side of the valve toward the engine cylinder so that pressure of the gas through the port and against the valve tends to hold the latter against the far side of the casing. This permits the wedge member to move freely under the action of opposing forces, and to compensate for varying diameters of the valve and casing under different temperature conditions. Among the forces acting on the wedge member are friction of the valve tending to move the wedge toward its base to increase the clearance, and one or more springs or other yielding means tending to move the wedge in the opposite direction and reduce clearance. As the wedge member has the gas port therethrough it presents a wider surface at one side of the port than at the other, and therefore high gas pressure in the cylinder tends to move the wedge toward its base end and increase the clearance. This force is the greatest when the gas pressure is the highest, but it is at that time that it is most important that leakage be prevented.

In my prior application, Serial No. 609,-386 filed December 28th, 1922, I have disclosed and broadly claimed a construction whereby an increase in pressure of the fluid controlled by the valve either exerts a tendency to move the wedge member to reduce clearance, or the pressure is balanced so as to have no direct effect on the movement of the wedge member. By means of such construction the relationship of the opposing actions of the spring and friction is not objectionably disturbed by varying gas pressures.

By means of my present invention I seek to accomplish the same general result as that sought in the application above referred to, but I avoid the necessity of the careful and accurate machining of the surfaces and provide operating parts which may be inexpensively manufactured by simple turning and drilling operations.

In my present invention I provide a plunger member which is exposed to the action of the gas in the cylinder and exerts a pressure on the wedge member to counterbalance the difference in surface areas at opposite sides of the port. The same plunger member also serves as the means for applying the spring pressure to the wedge member.

The accompanying drawing shows a transverse section through a cylinder head and engine valve provided with one form of mechanism embodying my invention.

In the construction illustrated the engine cylinder 10 has a piston 11 and a cylinder head 12 supporting the ignition means 13. The cylinder head constitutes a waterjacketed casing for a rotary valve and is provided with a main cylinder port 14, an exhaust port 15, and an inlet port 16. The valve 17 has passages 18 which connect the cylinder port to the exhaust and inlet ports in succession as the valve rotates counter clockwise. The main valve casing has a cylindrical bore within which is mounted a sleeve or liner 19 having a cylindrical bore eccentrically disposed in respect to the bore of the main outer casing. The eccentricity is in a direction substantially at right angles to the axis of the cylinder, and in a direction toward the exhaust port 15, so that the sleeve is very much thinner on the side toward the exhaust port than on the side toward the inlet port. The three ports 14, 15 and 16 extend through the sleeve, the inlet and exhaust ports being approximately diametrically opposite to each other. The sleeve 19 is formed of two sections one of which is rigidly secured to the outer or main casing in any suitable manner, while the other section 20 constitutes a curved wedge. The stationary part extends from a point adjacent the lower edge of the exhaust port around the valve to a point adjacent the lower edge of the inlet port, whereas the movable section or wedge member 20 extends from adjacent the lower edge of the exhaust port along the under side of the valve to the lower side of the inlet port. The wedge has limited circumferential movement due to the provision of clearance spaces or openings 22, 23 between the opposite ends of the wedge member and the opposed ends of the stationary part of the liner.

As the valve rotates counter-clockwise, it will be noted that the action of friction by the valve on the wedge member tends to move the latter toward its base end. It will also be noted that the portion 24 of the cylinder port 14 which extends through the wedge member has a surface 25 toward the narrow end of the wedge which is of less area than the surface 26 toward the base end of the wedge, and that therefore gas pressure in the passage will also tend to move the valve toward its base end, and that this tendency will vary with varying gas pressures.

As the important feature of my present invention I provide means acting on the wedge member for counter-balancing the two forces above mentioned, namely friction and pressure in the passage 24.

As shown I provide a piston 27 having a piston rod 28 engaging with the wedge member and acting substantially tangentially to move the latter toward the thinner edge. This piston is mounted in a small cylinder 29, one end of which is connected to the main engine cylinder by a passage 30, and the other end of which is connected to the inlet port 16 by a passage 31. Preferably the cylinder 29 is formed in a casing 32 which is threaded into the wall of the cylinder head. The casing has an annular row of ports at one end connecting to an annular groove communicating with the passage 30, while the opposite end is open directly to the passage 31. The casing member 32 has a transverse wall through which the piston rod 28 extends, and which forms a separate outer chamber 33 independent of the cylinder chamber 29. Within this outer chamber 33 the piston rod 28 is provided with a head 34 against which acts a spring 35. The outer end of the spring engages a cap or closure 36 for the outer end of the chamber 33 and having threaded engagement with the casing, whereby the compression of the spring may be adjusted if desired.

The casing 32 having threaded engagement with the cylinder head may be readily removed at any time for cleaning, inspection, adjustment or repair, and this removal does not disturb the adjustment of the cap 36. In practice the surface of the piston 27 exposed to the pressure of the gas in the engine cylinder through the passage 30 may be made approximately equal to the difference in areas of the surfaces 25 and 26, whereby at all times the action of gas pressure in the cylinder is neutralized. The other side of the piston 27 is at all times exposed to atmospheric pressure or pressures approximating the same, through the port 16, clearance space 22 and passage 31. During the intake stroke of the engine piston there is a partial vacuum in the engine cylinder 10, and this pressure acting on the surface 26 tends to pull the wedge member in toward its narrower edge, but it will be noted that the same vacuum acts through the passage 30 on to the piston 27 and tends to pull the piston toward the right from the position shown in the drawing. That is, it tends to pull the piston against the action of the spring 35 and to thus reduce the effective spring pressure on the wedge member. Thus, during suction the effect of partial vacuum on the surfaces 25 and 26 is neutralized by the corresponding reduction in spring pressure. The piston rod 28, may, if desired, be directly connected to the wedge member, but this is not necessary and it may merely contact with a hardened steel plug 37 set in a chamber in the wedge member. The surface of the piston 27 may bear any desired relationship to the excess of area of the surface 26 over the area of the surface 25. If the operative area of the piston 27 be greater than the difference between the surfaces 25 and 26 it will exert a pressure tending to move the wedge toward this smaller edge whenever the pressure in the engine cylinder is above that of the atmosphere. Preferably the ratio of the areas is such that high pressure in the engine cylinder exerts a small net effective pressure toward the thin edge of the wedge so as to better insure against leakage of such high pressure.

Having thus described my invention, what I claim as new and desire to secure by Letters Patent is:—

1. The combination with a rotary valve and its valve casing of a wedge member engaging with the valve and movable through a limited distance in respect to the casing, and a piston member having one surface exposed to the pressure of the fluid controlled by said valve and operatively connected to said wedge member.

2. The combination with a rotary valve and its valve casing of a curved wedge member having one surface engaging with the valve and movable circumferentially through a limited distance in respect to the casing, and a piston member operatively connected to said wedge member and having a surface exposed to the pressure of the fluid controlled by said valve, whereby the increase in pressure of the fluid controlled by the valve exerts a tendency to move the wedge member to reduce the clearance of the valve.

3. The combination with a rotary valve mounted for one-way rotation only, and a valve casing therefor, of a curved wedge member having one surface engaging with the valve and movable circumferentially through a limited distance in respect to the casing, and a piston member operatively connected to said wedge member and having a surface exposed to the pressure of the fluid controlled by said valve, whereby the pressure of the fluid controlled by the valve exerts a tendency to move the wedge member in a direction opposite to that of the direction of travel of the adjacent valve surface.

4. In combination a valve casing, a valve mounted therein for one-way rotation only, said casing having a movable section presenting an inner surface contacting with the valve and an outer surface eccentric to the surface of the valve, the direction of rotation of the valve being such that friction with said section tends to move the latter in one direction, and a movable member operatively connected to said wedge member, and movable in a direction substantially tangentially of said movable section, and having a surface exposed to the action of the fluid controlled by the valve.

5. In combination a valve casing, a valve mounted therein for one-way rotation only, said casing having a movable section presenting an inner surface contacting with the valve and an outer surface eccentric to the surface of the valve, the direction of rotation of the valve being such that friction with said section tends to move the latter in one direction, and a movable member operatively connected to said wedge member, and movable in a direction substantially tangentially of said movable section, and having a surface exposed to the action of the fluid controlled by the valve, and a spring operating to move said last mentioned member in the same direction as does high fluid pressure.

6. In combination, a valve casing, a rotary valve mounted for one-way rotation, a curved wedge member having its inner surface concentric with said valve and its outer surface eccentric thereto, the direction of rotation of the valve being such that friction tends to move said wedge member in one direction to increase clearance, resilient means tending to move said wedge member in the opposite direction, and a movable member operatively connected to said wedge member and operating in conjunction with said resilient means for applying the pressure of the fluid controlled by the valve to said wedge member in such a manner as to tend to move the latter in the last mentioned direction.

7. In combination a valve casing, a rotary valve mounted for one-way rotation, a curved wedge member having its inner surface concentric with said valve and its outer surface eccentric thereto, the direction of rotation of the valve being such that friction tends to move said wedge member in one direction to increase clearance, resilient means tending to move said wedge member in the opposite direction, said wedge member having a port therethrough, and a movable member operatively connected to said wedge member and exposed to the action of pressure of the fluid controlled by said valve.

8. In combination a valve casing, a rotary valve mounted for one-way rotation, a curved wedge member having its inner surface concentric with said valve and its outer surface eccentric thereto, the direction of rotation of the valve being such that friction tends to move said wedge member in one direction to increase clearance, resilient means tending to move said wedge member in the opposite direction, said member having a port therethrough, and a piston for controlling the application of fluid pressure to said wedge so that said fluid pressure acts with and in the same direction as said resilient means.

9. In combination a valve casing, a rotary valve therein, a curved wedge member between said casing and said valve, and having a port therethrough presenting a greater surface area at one side than at the other, resilient means tending to move said wedge member in one direction, and a piston member operatively connected to said wedge member and having an effective area exposed to the action of fluid pressure controlled by the valve, and substantially equaling the difference between said surface areas.

10. In combination a valve casing, a rotary valve, a wedge member movable to vary the clearance of the valve in said valve casing, a piston member operatively connected to said wedge member and having one surface exposed to the pressure of the fluid controlled by said valve, and a spring also acting on said piston member to move it in the same direction as that effected by high fluid pressure.

11. In combination a rotary valve, a valve casing therefor, a member between said casing and said valve, and movable to control clearance, resilient means tending to move said member in one direction, and a piston exposed to the pressure of the fluid controlled by the valve and tending to move said member in said direction.

12. In combination a rotary valve, a valve casing, a member engaging with said valve whereby the rotary movement of the valve tends to move said member in one direction to increase clearance, a piston connected to said member, and having one surface exposed to the action of the fluid controlled by said valve, whereby high fluid pressure tends to move said member in the other direction.

13. In combination a rotary valve, a valve casing, a member engaging with said valve whereby the rotary movement of the valve tends to move said member in one direction to increase clearance, a piston connected to said member, and having one surface exposed to the action of the fluid controlled by said valve, whereby high fluid pressure tends to move said member in the other direction, and a coil spring also acting on said piston member to move it in the last mentioned direction.

14. In combination a rotary valve, a valve casing, a member within said casing and engaging with said valve and movable to control clearance, a casing secured to said valve casing and having a pair of chambers therein, a piston in one of said chambers, connections between said piston and said member, means connecting said chamber with the source of fluid pressure controlled by said valve, a head in the other chamber and connected to said piston, and a spring in said last mentioned chamber acting on said head.

15. In combination a rotary valve, a valve casing, a movable member within the casing and engaging with said valve for controlling clearance, and means for moving said member in a direction to reduce clearance, said means including a casing having a pair of chambers, a piston within one of said chambers, a head within the other chamber, said piston and head being connected together, and to said member, a spring acting on said head, and means for connecting the chamber of the piston to the source of fluid pressure controlled by said valve.

Signed at Los Angeles, State of Calif., this 20th day of January, A. D. 1925.

RUDOLPH WEHR.